United States Patent [19]

Ruffo et al.

[11] Patent Number: 5,009,672

[45] Date of Patent: Apr. 23, 1991

[54] PROCESS FOR RECYCLING AND REUTILIZING WASTE, IN PARTICULAR SOLID URBAN WASTE

[75] Inventors: Giorgio Ruffo, Milan; Luciano Vezzani, Ovada, both of Italy

[73] Assignee: Vezzani S.p.A., Ovada, Italy

[21] Appl. No.: 406,645

[22] Filed: Sep. 13, 1989

[30] Foreign Application Priority Data

Sep. 15, 1988 [IT] Italy .............................. 21956 A/88

[51] Int. Cl.$^5$ .............................................. C10L 5/06
[52] U.S. Cl. ........................................ 44/593; 44/595; 44/596
[58] Field of Search ................. 44/589, 590, 593, 596, 44/595

[56] References Cited

U.S. PATENT DOCUMENTS

| | | | |
|---|---|---|---|
| 3,506,414 | 4/1970 | Skendrovic | 44/594 |
| 3,790,091 | 2/1974 | Law et al. | 44/589 |
| 3,910,775 | 10/1975 | Jackman | 44/589 |
| 4,026,678 | 5/1977 | Livingston | 44/589 |
| 4,135,888 | 1/1979 | Waltrip | 44/589 |
| 4,445,906 | 5/1984 | Riemann et al. | 44/596 |
| 4,561,860 | 12/1985 | Gulley et al. | 44/596 |
| 4,859,211 | 8/1989 | Moore | 44/589 |

OTHER PUBLICATIONS

McGraw-Hill Series in Chemical Engineering, The Chemical Process Industries, Shreve, 2nd Ed., McGraw-Hill Book Co. Inc., N.Y., 1956, pp. 664-666.

Primary Examiner—Margaret B. Medley
Attorney, Agent, or Firm—Guido Modiano; Albert Josif

[57] ABSTRACT

Process for recycling and recovering solid urban waste and the like, consisting in subjecting solid urban waste (SUW), after the removal of any ferromagnetic material present therein, to high-pressure compression inside a screening press or the like, so as to separate the putrescible organic material from the dry material intended to form the combustible material, then subjecting the organic material to a process of anaerobic fermentation in a sealed and dry environment, so as to allow to extract, at the end of the fermentation cycle, the biogas thus produced, which can be used directly for producing electric power or for other uses, the residuals of fermentation in the form of humus being subsequently subjected to refining and then to screening to recover the light materials; sifting, within a known rotary screen, the dry material so as to separate the combustible components, such as paper, fabrics, wood, plastics, leather and rubber, from the inert ones, such as glass, non-ferrous metals and any organic parts; the combustible components being then brought to a size suitable for a subsequent briquetting operation in order to obtain a stockable solid fuel.

8 Claims, 2 Drawing Sheets

PROCESS FOR RECYCLING AND REUTILIZING WASTE, IN PARTICULAR SOLID URBAN WASTE

BACKGROUND OF THE INVENTION

The present invention relates to a highly flexible process for the substantially complete recycling and reutilization of waste of various composition, and in particular of solid urban waste, which allows a final recovery of combustible substances and of amending and/or fertilizing substances.

As is known, the main consequence of the development and constant growth of mass consumption is the enormous and constantly increasing production of waste in general and of solid urban waste in particular.

The problem of the disposal of these enormous amounts of waste is currently managed with various methods, one of which consists in permanently or temporarily abandoning the waste, and in particular solid urban waste, in controlled landfills in view of a future total or partial reutilization, such landfills being meant to protect the inhabitants of the surrounding areas against air and water pollution; other methods consist in disposing solid urban waste by means of a bacterial aerobic process termed composting. This process is essentially a biological oxidation similar to that which spontaneously occurs in nature in the undergrowth due for example to the presence of macerated leaves or the like; it is therefore an intrinsically slow process which can, however, be made faster and more complete by trying to aerobically facilitate the transformation of the organic substances, utilizing the enzymes secreted by the microflora which is naturally associated with said organic substances; in this process it is possible to partially improve the organic part of solid urban waste by treating the organic material with the sludge produced by urban conditioning plants.

Another known method consists in incinerating solid urban waste with energy recovery, i.e. a process of complete pyrolysis of the waste which produces both gaseous effluents, which can be used to produce energy and must be subsequently conditioned before they are sent to the chimney, and solid effluents to be sent to the slag discharge.

These known disposal methods for solid urban waste in practice entail the use of plants which are complicated, expensive and difficult to manage, especially due to the fact that the composition of solid urban waste may vary even to a considerable extent and also due to the fact that the energy yield does not always justify plant and production costs. The effluents produced with current plants, especially incineration plants, furthermore have a high pollution rate and require adequate elimination plants.

In order to optimize known methods for solid urban waste recovery, it has already been proposed to separate the combustible part therefrom and to use only this part as waste-derived fuel; in this case the solid urban waste is processed so as to separate the ferrous and non-ferrous metallic parts, the glass and inert materials and thus obtain an entirely combustible part as residual. The adopted separation devices produce fuels with low heating value which are subsequently enriched; said devices are usually arranged ahead of the incineration furnace. If the fuel obtained as described above is instead ground to homogenate the mass, the resulting fuel has a higher heating value. In order to allow the storage of fuel derived from solid urban waste, said fuel is furthermore pelletized, for example by extrusion.

SUMMARY OF THE INVENTION

The aim of the present invention is to provide a process for recycling solid urban waste which eliminates the economical and ecological disadvantages of the disposal processes currently in use and most of all totally inertizes solid urban waste of any composition and size, eliminating the release of biogas in the atmosphere, produces a solid fuel derived from solid urban waste with a high energy content and also allows the reutilization of the organic part, which is separated from the dry one, in the form of a paste-like mass which can be used as amending or fertilizing substance for agricultural soil.

Another object of the invention is to provide a process for recycling and recovering solid urban waste which has such operative steps as to allow the residual products of intermediate operative steps to have improved economical and ecological characteristics and advantages with respect to the initial products.

A further object of the invention is to provide a process as described above which allows high operative flexibility and complete recycling of solid urban waste with no negative impact on the outer environment, since there is no production of liquid and gaseous pollutants.

This aim, these objects and others which will become apparent from the following description are achieved by a process for recycling and recovering solid urban waste which comprises, according to the present invention, a sequence of operative steps which consist in:

after the removal of any ferromagnetic material present in the solid urban waste, performed in a known manner, subjecting said waste to high-pressure compression inside a screening press or the like, so as to separate the putrescible organic material from the dry material intended to form the combustible material, then subjecting said separated organic material, in a finely divided form, to a process of anaerobic fermentation in a sealed environment with controlled humidity, so as to extract, at the end of the fermentation cycle, the biogas thus produced, which is to be used directly for producing electric power or for other uses; the residuals of the fermentation, in the form of humus, being subsequently refined and then screened to recover the light materials, to be combined with the dry fuel which has been separated by pressing, and then sifting, within a known rotary screen, the dry material so as to separate the combustible components, such as paper, fabrics, wood, plastics, leather and rubber from inert ones, such as glass, powders, non-ferrous metals and any organic parts; the combustible components being then brought to a size suitable for a subsequent briquetting operation in order to obtain a solid fuel which can be stocked in safety conditions even for long periods of time.

More particularly, said inert residuals are obtained by sifting the dry material in a rotary screen, and can be sent directly to landfills or mutually agglomerated and then treated thermally to increase their density in order to use them as gravel or rubble for various uses, for example as a road foundation.

BRIEF DESCRIPTION OF THE DRAWINGS

The process according to the invention is now described in greater detail according to one of its possible practical embodiments, with reference to the accompanying drawings, which are given merely by way of non-limitative example and in which.

DESCRIPTION OF THE PREFERRED EMBODIMENTS

Figure 1:
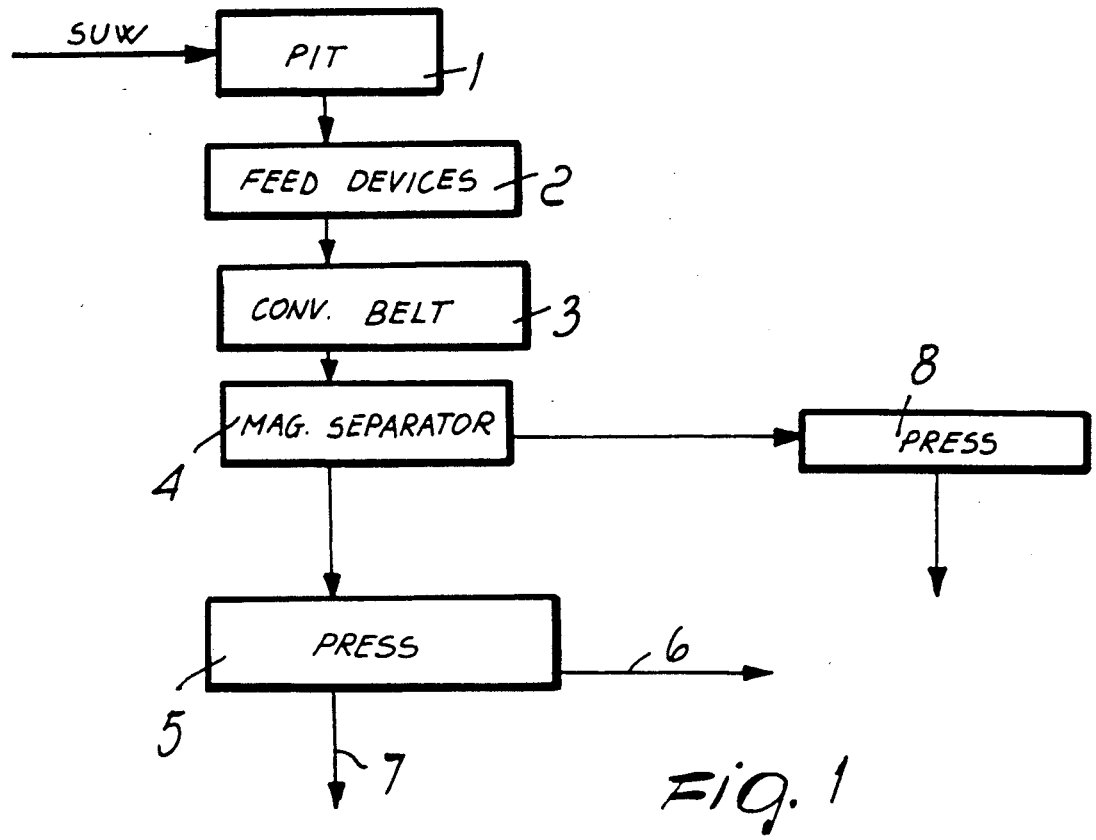
FIG. 1 is a block diagram of the sequence of operative steps related to the initial separation of the organic material from the dry material, obtained with the solid urban waste recycling process according to the invention.
Figure 2:
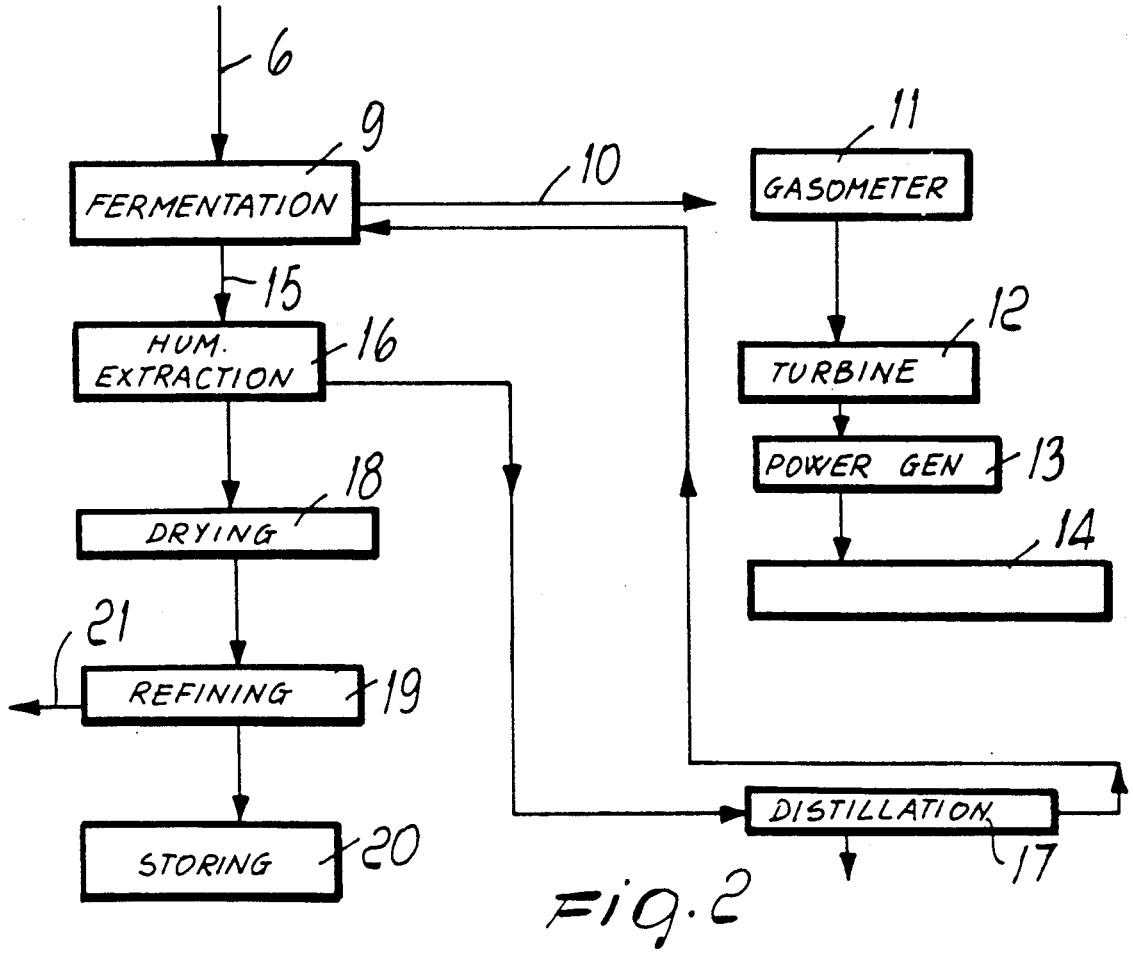
FIG. 2 is another block diagram of the operative steps adopted in the process according to the invention to improve the organic material separately from the dry material.
Figure 3:
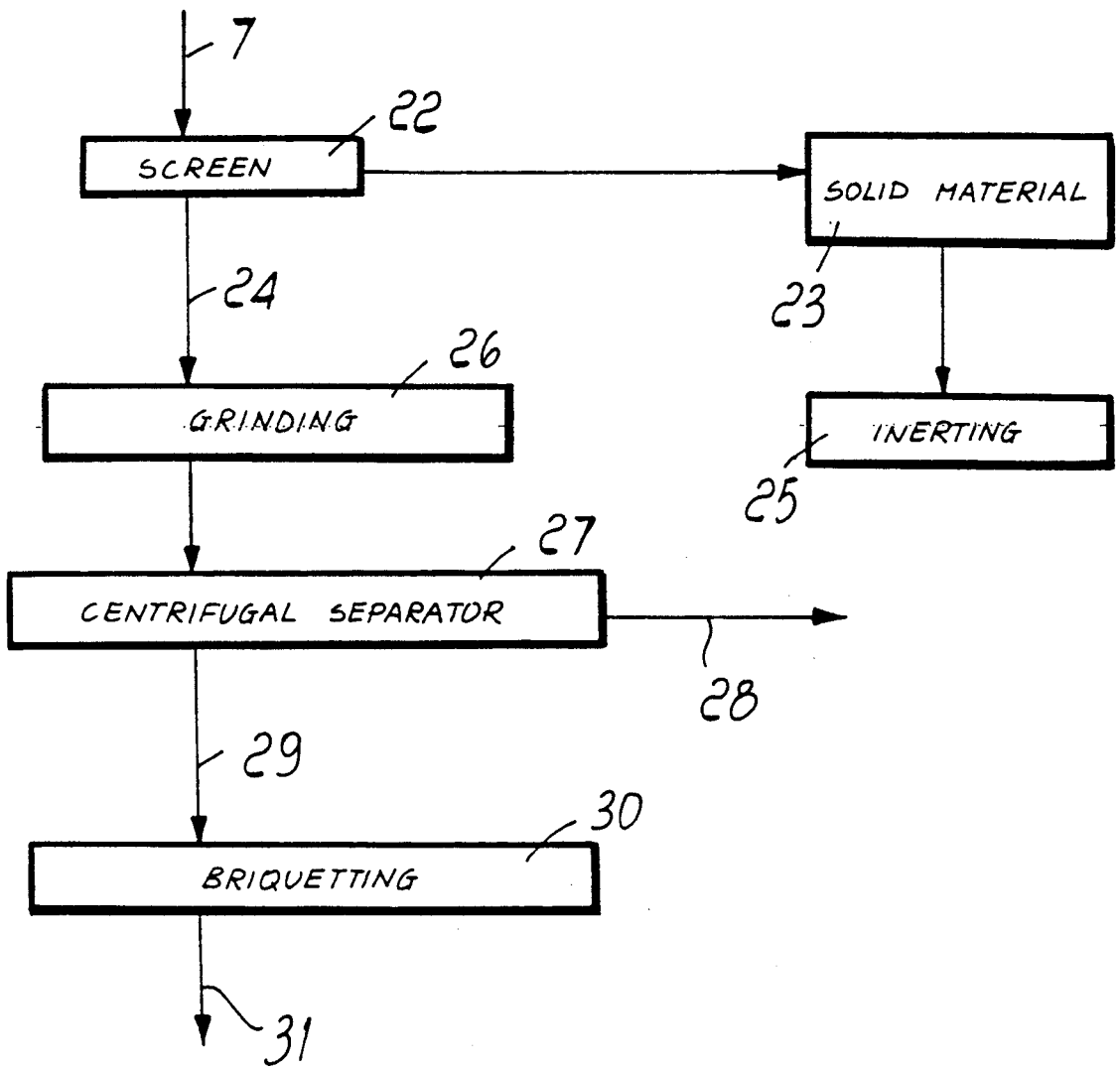
FIG. 3 is a diagram of the operative steps required according to the invention in order to produce solid fuel starting from the dry material separated from the organic material.

With reference to the above described block diagrams, it can be easily seen that the process for recycling and recovering solid urban waste essentially comprises three main groups of operative steps which can be termed operative modules: specifically, a step of initial separation of the organic part of the waste from the dry part (FIG. 1), a separate step of degradation and improvement of the organic part produced in the first operative step (FIG. 2), and a separate treatment step for the dry part in order to obtain a solid fuel with a high heating value which is free from pollutants when stored as well as during combustion (FIG. 3).

In practice, the individual operative steps or modules are provided by means of known devices which are combined in a centralized-control plant, though each module has a highly flexible automated control so that it can be used for solid urban waste of variable composition and most of all so that it can give improved ecological and economical characteristics, with respect to those of the initial products, to the residual products available at the end of each treatment step.

With reference to the accompanying figures, the sequence of operative steps which constitute the module for separating the organic part from the dry part (FIG. 1) comprises a collection pit 1 for solid urban waste (SUW) from which said waste is fed with known devices 2 onto a conveyor belt 3 which feeds the material continuously into a high-pressure press 5 which separates in a known manner the putrescible organic material or pulp 6 from the dry material 7 in the waste.

During the motion of the waste along the conveyor belt, a magnetic separator 4 eliminates all the ferromagnetic material contained in said waste.

The separation of the organic material from the dry material is aimed at eliminating all or practically all of the putrescible organic part from the dry material in order to possibly send the dry part free from biodegradable organic material to a landfill. The ferromagnetic material separated before compression in the press is compacted in a press 8 so that it can be sent to steel plants.

A particularly effective separation of the organic material from the dry material can be achieved with the screen separation plant described in the Italian patent No. 1,190,043 in the name of the same Applicant. In said plant, the solid urban waste is compressed at high pressure, so that all the soft and therefore organic components are separated by extrusion through appropriate holes defined in the compression chamber, while the dry part, constituted by paper, plastics, fabric, glass, non-ferrous metals and other fine constituents are expelled in the form of compacted blocks upon every compression cycle.

The dry part which contains combustible and inert material is sent to the module for producing the combustible material separately with respect to the inert material (FIG. 3), while the organic part feeds the degradation and improvement module illustrated in FIG. 2.

The finely divided organic part which is processed in the module of FIG. 2 also contains small amounts of finely divided plastic, glass and soil pulverized to such a size as to be impalpable.

In the module of FIG. 2, the organic part 6 (which may contain approximately 55% of dry organic material) is subjected to a process of anaerobic fermentation 9 in a closed and dry environment, such as a sealed reactor, which allows a better use of the volume of the reactor; in this case, a complete recovery of biogas 10 is achieved, and said biogas can be fed into a gasometer 11 for subsequent use, i.e. to power a turbine 12 which actuates an electric power generator 13. The soft part (humus) 15, obtained by fermentation, is brought to a humidity content suitable for preserving it and water is extracted therefrom at 16; the extracted water is sent to distillation 17 so as to separate the pollutants.

The fermented organic part is then dried at 18 and is then subjected to refining 19 by means of a hopper which is provided, on its bottom, with a feed and extraction belt. The refining of the humus allows to separate a dry product, which can be stored in 20, from the light pollutants 21 which are generally constituted by small-size pieces of plastics.

The complete process of anaerobic fermentation occurs in a time which varies between 15 and 20 days, and allows to obtain a residual humus free from pathogen micro-organisms.

After refining, the dry humus is broken up and then screened so as to recover the light materials 21 to be sent to the solid-fuel production module and so as to recover the refined material 20 to be stored in the open air or in silos.

Since the entire fermentation-refining process is performed within closed and sealed reactors, it avoids the development of unpleasant odors in the atmosphere; said odors are in fact extracted together with the biogas and are destroyed in the electric power generating cycle.

The sequence of operative steps which constitute the module of FIG. 3, intended to produce solid fuel purified of inert and polluting substances which might produce unacceptable gaseous effluents during combustion, provides the transfer of the dry material 7, which arrives from the module for separating the organic substances by compression, into a two-stage rotary screen 22; this allows to separate the inert materials 23, i.e. glass, non-ferrous materials, fine powders and a small part of organic material, from the combustible part 24 which is constituted by paper, textile products, plastics, rubber, leather and a few other materials.

The solid material 23 is then completely inertized in 25 and can be agglomerated and subjected to a thermal densifying treatment so as to give it the size of gravel to be used, for example, as material for road foundations.

The combustible material 24 is instead subjected to grinding 26, is then classified for example in a centrifugal separator 27 for separating the air from the solid material, so as to separate the parts 28, constituted by chlorinated heavy plastics, rubber, leather and aluminum, from the light parts 29, constituted by plastics in film, paper and textiles.

The fractions of light solid combustible material 29 are then sent to a briquetting device 30 in order to obtain stable briquets 31 suitable for storage or for transportation like any other solid fuel, while the heavy fractions 28 are sent to landfills.

The solid fuel thus obtained has been observed to be particularly suitable for use, together with coal, in thermal systems and in particular for producing cement and tiles, since the high temperature required in these plants avoids the possible production of organic micro-pollutants.

From what has been described above, the process for recycling solid urban waste according to the invention provides a complete recovery without requiring any particular pre-treatment for said waste, and the particular operative steps adopted are provided so as to produce no solid and gaseous pollutants; the process is in fact conceived so as to convert into derived energy all the energy content present in waste and so as to return the organic materials to nature in the form of humus.

Finally, the particular conceptual and operative modularity of the process according to the invention has the advantage to stop the process after the step of separation by compression, obtaining a dry residual product which has already been improved, from an ecological and economical viewpoint, with respect to the initial product and which might be taken to a landfill for various reasons; in this case, a subsequent disposal would obviously be less onerous.

In practice, the process described above according to a preferred embodiment is susceptible to functionally and/or structurally equivalent modifications and variations, both in the devices employed and in the management of the various steps or modules, without thereby abandoning the scope of the protection of the present invention.

We claim:

1. Process for the recycling and complete recovery of solid urban waste and similar waste, comprising the steps of:

subjecting the solid urban waste (SUW) to high-pressure compression so as to separate putrescible organic material in a finely divided form from dry material of the solid urban waste, subjecting said organic material to a process of anaerobic fermentation in a sealed reactor in order to extract biogas and obtain soft humus thus produced by the fermentation, subjecting said dry material to a screening process to separate combustible material, such as paper, fabrics, wood, plastics, leather, and rubber, from inert material, such as glass, powders, and non-ferrous metals, and subjecting said combustible material obtained from said screening process to a briquetting operation to obtain a solid fuel.

2. Process according to claim 1, further comprising the step of subjecting the humus obtained from the fermentation process to a refining and a screening process to recover light materials therefrom, said light materials subsequently being combined with said dry material obtained in said high-pressure compression step to thereby undergo the step of said screening process to separate combustible material from inert material.

3. Process according to claim 1, wherein said inert material obtained from said screening process is suitable to be sent directly to a landfill.

4. Process according to claim 1, wherein said inert material obtained from said screening process is agglomerated and subsequently subjected to a thermal densifying treatment in order to use said inert material as rubble-like gravel.

5. Process according to claim 1, further comprising the step of subjecting the combustible material, before the step of briquetting, to a grinding process and subsequently to a selection process by means of a separator for separating heavy parts, such as chlorinated heavy plastics, rubber, leather, and aluminum, from light parts, such as plastics in film, paper, and textiles, said light parts being subjected to said briquetting process.

6. Process according to claim 1, wherein a press is used to separate the dry part from the putrescible organic part under high pressure, said press being suitable to separate said organic part in a finely divided form so as to undergo said anaerobic fermentation in an effective limited time of substantially 15 to 20 days.

7. Process according to claim 1, further comprising the step of subjecting the waste, before the step of high-pressure compression, to a process of eliminating ferromagnetic material from the waste by means of a magnetic separator.

8. Process for the recycling and complete recovery of solid urban waste and similar waste, comprising the steps of:

subjecting the solid urban waste (SUW) to high-pressure compression so as to separate putrescible organic material in a finely divided form from dry material of the solid urban waste, subjecting said organic material to a process of anaerobic fermentation in a sealed reactor in order to extract biogas and obtain soft humus thus produced by the fermentation, subjecting the humus obtained from the fermentation process to a refining and a screening process to recover light materials therefrom, said light materials subsequently being combined with said dry material obtained in said high-pressure compression step, subjecting said dry material with said light materials to a screening process to separate combustible material, such as paper, fabrics, wood, plastics, leather, and rubber, from inert material, such as glass, powders, and non-ferrous metals, and subjecting the combustible material to a grinding process and subsequently to a selection process by means of a separator for separating heavy parts, such as chlorinated heavy plastics, rubber, leather, and aluminum, from light parts, such as plastics in film, paper, and textiles, subjecting said light parts obtained from said screening process to a briquetting operation to obtain a solid fuel.

* * * * *